United States Patent [19]
John

[11] Patent Number: 5,977,656
[45] Date of Patent: Nov. 2, 1999

[54] SWITCHING NETWORK FOR CIRCUIT WITH MULTIPLE POWER SOURCES

[75] Inventor: Paul John, Hazlet, N.J.

[73] Assignee: Lucent Technologies Inc., Murray Hill, N.J.

[21] Appl. No.: 09/108,763

[22] Filed: Jul. 1, 1998

[51] Int. Cl.$^6$ ....................................................... H02J 1/00
[52] U.S. Cl. .................. 307/43; 307/72; 307/80
[58] Field of Search .................. 307/43, 75, 80, 307/85, 86, 18, 22, 23, 26, 328, 72, 64, 65, 69; 318/105, 106, 107, 109, 123, 124, 440, 441; 330/124 R, 125, 147, 295; 361/192, 193

[56] References Cited

U.S. PATENT DOCUMENTS

| | | | |
|---|---|---|---|
| 4,446,376 | 5/1984 | Baker | 307/87 |
| 4,794,507 | 12/1988 | Cavigelli | 363/86 |
| 5,081,367 | 1/1992 | Smith et al. | 307/64 |
| 5,432,387 | 7/1995 | Kogure et al. | 307/328 |
| 5,581,133 | 12/1996 | Smith et al. | 307/64 |
| 5,646,459 | 7/1997 | Hatate et al. | 307/85 |
| 5,821,641 | 10/1998 | Demo et al. | 307/125 |

*Primary Examiner*—Fritz Fleming
*Assistant Examiner*—Peter Zura

[57] ABSTRACT

A power supply circuit drives a load with first and second power sources. The power supply circuit has a switching network comprising a first switch and an interlock switch. A first circuit section connects the first power source to the load only when both the first switch and the interlock switch are on, and a second circuit section connects the second power source to the load only when both the first switch and the interlock switch are on. The switching network provides isolation between the first and second circuit sections.

8 Claims, 3 Drawing Sheets

100

200

SWITCHING NETWORK FOR CIRCUIT WITH MULTIPLE POWER SOURCES

BACKGROUND OF THE INVENTION

1. Field of the Invention

The present invention relates to systems with multiple power sources and, in particular, to power supplies having multiple power sources and a switching network used to selectively turn such power sources on and off.

2. Description of the Related Art

Various types of systems, such as power supplies, employ multiple power sources, which are typically used to drive a load in the system. For example, some power supply circuits have both AC and DC input voltage sources. These sources are typically selectively switched "on" or "off" with switches, to selectively couple or decouple, respectively, the power source to the load.

Referring now to FIG. 1, there is shown a circuit diagram of a prior art power supply circuit 100. Circuit 100 contains load $R_{L1}$, which may be selectively driven by either AC or DC power. Load resistor $R_{L1}$ is shown twice in FIG. 1, but may be physically the same load. To drive the load with AC, AC power source 101 is applied to AC to DC switching supply 102, which provides a DC output 103. DC power source 111 may also be applied to the load. A typical output for DC output 103 and DC power source 111 is –48 V with respect to ground.

Circuit 100 comprises AC connection network 121, DC connection network 123, and power source switching network 122. AC connection network 121 comprises load $R_{L1}$, resistors $R_{12}$ and $R_{13}$, and transistor $Q_{10}$. DC connection network 123 comprises load $R_{L1}$ (which, as noted above, may be physically the same as load $R_{L1}$ of network 121), resistors $R_{14}$–$R_{17}$, and transistors $Q_{11}$ and $Q_{12}$. Switching network 122 comprises three switches: AC switch $SW_{11}$, interlock switch $SW_{12}$, and DC switch $SW_{13}$. As illustrated, each switch (which has one or more "no contact" terminals labeled "NC" in FIG. 1) is shown in the "off" position, so that both AC and DC power sources are "off", or not coupled to the load $R_{L1}$. The configuration illustrated may be referred to as the initial position. Interlock switch $SW_{12}$ is a double-pole double-throw momentary switch, having dual switches (illustrated as coupled by a dashed line), which move together. AC and DC switches $SW_{11}$ and $SW_{13}$ are single-pole double-throw switches.

The switches of switching network 122 may be selectively switched to turn on the AC power source 101, to turn on the DC power source 111, or to turn both power sources on or off. There is typically a need to manually turn both AC and DC power sources on or off, which may be referred to as the manual switching function. There is also typically a need for an "interlock switch" capability or function, that ensures that neither power source is on, when the interlock switch is off, regardless of the state of any other switches in the switching network. Further, there is a need to isolate the switches, so that no current flows through the switches from the AC to the DC side of circuit 100, or vice-versa, regardless of the on or off state of the switches.

The interlock capability may typically be required where, for example, circuit 100 is implemented on a circuit board that is part of a power module, which module can reside in a housing or system carrier. Whenever the power module is physically outside of the housing, the interlock switch should be off, for safety and other reasons, to ensure that the system is not energized by either power source when the components are exposed. Thus, the interlock switch may be configured so that whenever the power module is securely seated within the housing, the interlock switch is on, and automatically off otherwise. Whenever the interlock switch is on, the user needs to have the ability to selectively switch the AC and DC power sources on or off. In addition, the switching network needs to be isolated in the sense described above.

In switching network 122, as described below, switch $SW_{12}$ is the interlock switch, AC switch $SW_{11}$ controls whether the AC power source 101 is on or off (when the interlock switch $SW_{12}$ is on), and DC switch $SW_{13}$ controls whether the DC power source 111 is on or off (when the interlock switch $SW_{12}$ is on). When interlock switch $SW_{12}$ is off, both AC and DC power sources are off, regardless of the state of switches $SW_{11}$ and $SW_{13}$.

To ensure that both power sources are turned off whenever the power module is not fully seated in the housing, interlock switch $SW_{12}$ is adapted so that it is only on when pressure caused by filly seating the power module turns it on. Thus, when interlock switch $SW_{12}$ is off, as illustrated in FIG. 1, node 131, at the junction of resistors $R_{12}$ and $R_{13}$ and the base terminal of transistor $Q_{10}$, is grounded. Thus, transistor $Q_{10}$ is turned off, and no current flows through load $R_{L1}$ from the AC power source 101. In this case, AC connection network 121 does not serve to connect or couple AC power soure 101 to load $R_{L1}$, since interlock switch $SW_{12}$ being off causes AC connection network 121 to fail to allow such a connection.

Similarly, node 132, at the junction of resistors $R_{14}$ and $R_{15}$ and the base terminal of transistor $Q_{11}$, is not coupled to ground, and a current thus flows through resistor $R_{15}$, driven by DC power source 111, which gives rise to a voltage at node 132 sufficient to turn on transistor $Q_{11}$. This diverts current flowing through resistor $R_{17}$ through transistor $Q_{11}$ instead of through resistor $R_{16}$, and effectively grounds the base terminal of transistor $Q_{12}$. Thus, transistor $Q_{12}$ is turned off, and no current flows through load $R_{L1}$ from the DC power source 111. In this case, DC connection network 123 does not serve to connect or couple DC power source 111 to load $R_{L1}$, since interlock switch $SW_{12}$ being off causes DC connection network 123 to fail to allow such a connection.

It can be seen that both power sources are turned off as long as interlock switch $SW_{12}$ is off, since node 131 is still grounded, and node 132 is not grounded, regardless of the state of switches $SW_{11}$, $SW_{13}$. Whenever interlock switch $SW_{12}$ is off, i.e. whenever the power module is not fully seated in the housing, circuit 100 may be said to be in interlock mode. Alternatively, when interlock switch $SW_{12}$ is on, circuit 100 is not in interlock mode, and, therefore, AC switch $SW_{11}$ can be used to turn the AC power source 101 on or off, and the DC switch $SW_{13}$ can be used to turn the DC power source 111 on or off, as described below.

To turn on the AC power source 101, interlock switch $SW_{12}$ must be turned on, and switch $SW_{11}$ is also turned on, to activate AC connection network 121. Turning on AC switch $SW_{11}$ when the circuit is not in interlock mode decouples node 131 from ground, thereby allowing transistor $Q_{10}$ to turn on, which allows current to flow from the AC power source's DC output 103 through load $R_{L1}$. Thus, when circuit 100 is not in interlock mode, turning on AC switch $SW_{11}$ activates AC connection network 121, which causes AC power source 101 to be coupled to load $R_{L1}$.

Similarly, to turn on the DC power source 111, interlock switch $SW_{12}$ must again be turned on, and switch $SW_{13}$ is also turned on. This couples node 132 to ground, thereby allowing transistor $Q_{12}$ to turn on, which allows current to flow from the DC power source 111 through load $R_{L1}$. Thus, when circuit 100 is not in interlock mode, turning on DC switch $SW_{13}$ activates DC connection network 123, which causes DC power source 111 to be coupled to load $R_{L1}$.

In typical usage, switches $SW_{11}$ and $SW_{13}$ are both turned on, so that both power sources are applied to load $R_{L1}$. DC power source 111 may serve as a back-up in case of power failure or irregularities in AC power source 101. During normal operation, DC power source 111, which may be a rechargeable battery, may be constantly re-charged by DC output 103 from AC power source 101. Whenever AC power source 101 fails, for example due to a power outage, DC power source 111 drives load $R_{L1}$ with no loss of continuity. Whenever the power module is removed from its housing, pressure is released from the back plane of the circuit board, which contains the pressure-sensitive portion of switch $SW_{12}$, thereby causing interlock mode to be established and turning off both power sources.

Switching network 122 also performs the isolation function described above, since no switch configuration provides a current path between nodes 132 and 131. This is accomplished due in part to the fact that interlock switch $SW_{12}$ is a double-pole double-throw switch, having two separate switch bars. Thus, switching network 122 is isolated, such that switching network 122 does not provide a current patch between AC connection network 121 and DC connection network 123.

Unfortunately, circuit 100 requires three separate switches in switching network 122 to perform the above-described functions. Each switch required in a circuit such as power supply circuit 100 adds extra expense and complexity (for example, to make switches other than the interlock switch accessible to users), and requires scarce printed-wiring board (PWB) area.

SUMMARY

In the present invention, a power supply circuit drives a load with first and second power sources. The power supply circuit has a switching network comprising a first switch and an interlock switch. A first circuit section connects the first power source to the load only when both the first switch and the interlock switch are on, and a second circuit section connects the second power source to the load only when both the first switch and the interlock switch are on. The switching network provides isolation between the first and second circuit sections.

DESCRIPTION OF THE PREFERRED EMBODIMENT

Figure 2:
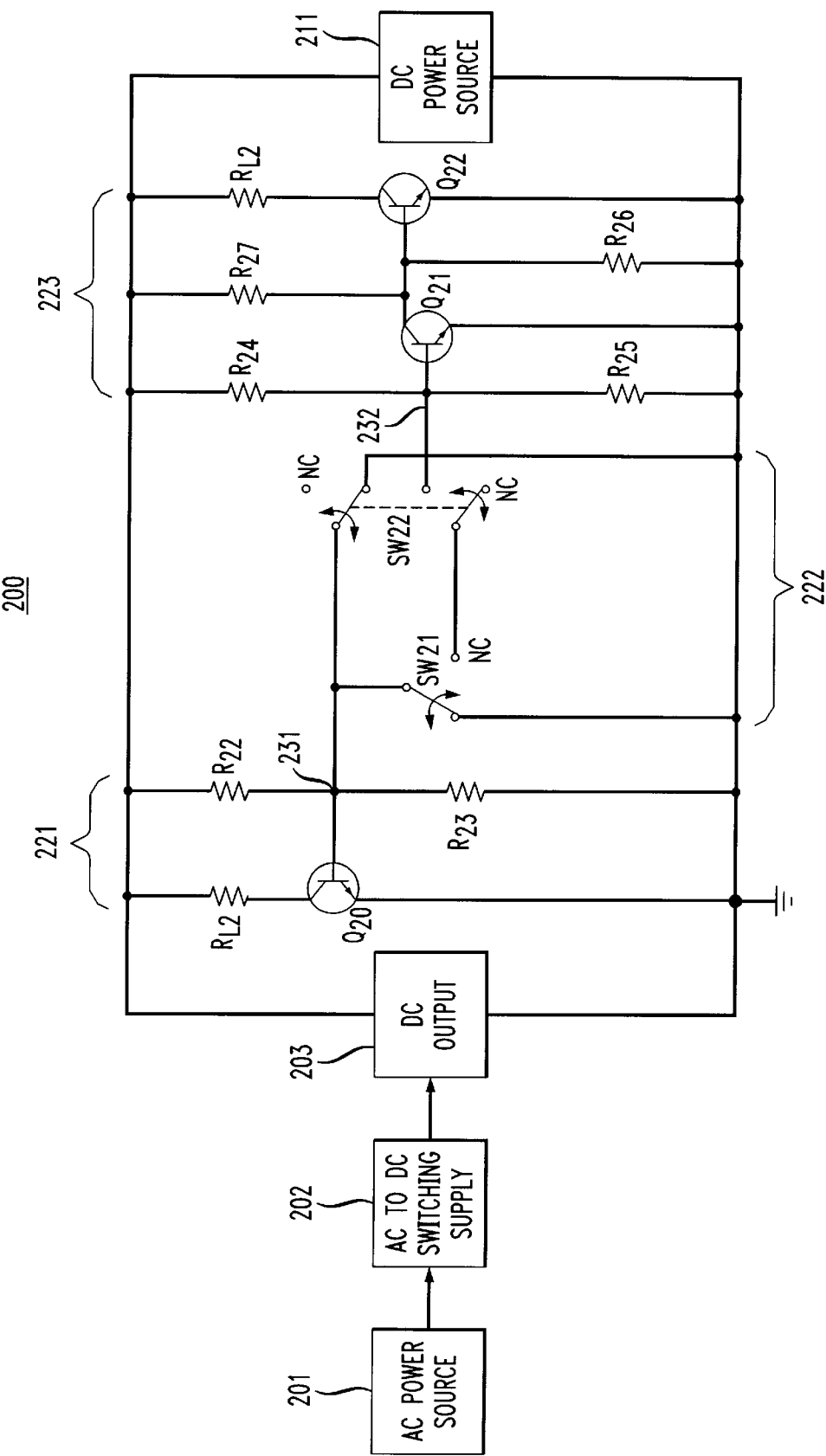
FIG. 2 is a circuit diagram of a power supply circuit having an improved switch configuration, in accordance with an embodiment of the present invention.

Referring now to FIG. 2, there is shown a circuit diagram of a power supply circuit 200 having an improved switching network 222, in accordance with an embodiment of the present invention. Circuit 200 is identical to circuit 100 described above, except for switching network 222, which is configured differently and contains only two switches, instead of three, while still performing the necessary interlock and manual switching, and isolation functions.

Circuit 200 contains load $R_{L2}$, which may be driven by AC and DC power sources 201, 211. Load resistor $R_{L2}$ is shown twice in FIG. 2, but may be physically the same load. To drive the load with AC, AC power source 201 is applied to AC to DC switching supply 202, which provides a DC output 203. DC power source 211 may also be applied to the load. A typical output for DC output 203 and DC power source 211 is $-48$ V with respect to ground.

Circuit 200 comprises AC connection network 221, DC connection network 223, and power source switching network 222. AC connection network 221 comprises load $R_{L2}$, resistors $R_{22}$ and $R_{23}$, and transistor $Q_{20}$. DC connection network 223 comprises load $R_{L2}$ (which, as noted above, may be physically the same as load $R_{L2}$ of network 221), resistors $R_{24}$–$R_{27}$, and transistors $Q_{21}$, and $Q_{22}$. Switching network 222 comprises two switches: AC/DC switch $SW_{21}$, and interlock switch $SW_{22}$. As illustrated, each switch is shown in the initial, "off" position, so that both AC and DC power sources are "off", or not coupled to the load $R_{L2}$. Interlock switch $SW_{22}$ is a double-pole double-throw momentary switch, having dual switches (illustrated as coupled by a dashed line), which move together. AC/DC switch $SW_{21}$ is a single-pole double-throw switch.

The switches of switching network 222 determine whether AC and DC power sources 201, 211, are on or off. In particular, if both switches $SW_{21}$ and $SW_{22}$ are on, then both power sources are on; if either switch is off, then both power sources are off. Switching network 222 thus provides for the manual switching function, by which a user can flip switch $SW_{21}$ to turn the power sources on or off (when circuit 200 is not in interlock mode). Switching network 222 also provides for the interlock capability described above, as well as the isolation function described above.

In switching network 222, as described below, switch $SW_{22}$ is the interlock switch, and AC/DC switch $SW_{21}$ controls whether the AC and DC power sources 201, 211 are on or off (when the interlock switch $SW_{22}$ is on). When interlock switch $SW_{22}$ is off, both AC and DC power sources are off, regardless of the state of switch $SW_{21}$.

Figure 1:
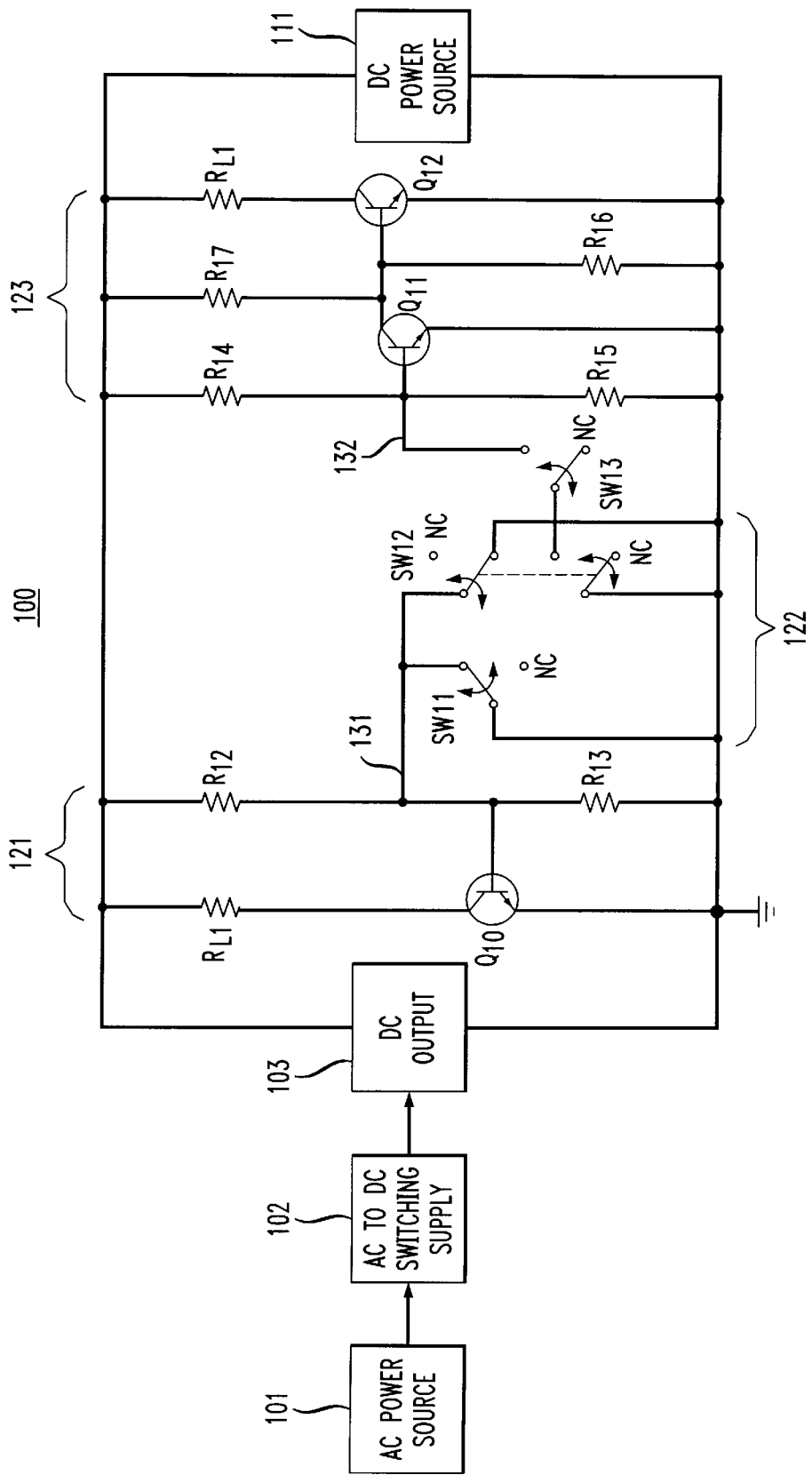
FIG. 1 is a circuit diagram of a prior art power supply circuit.
Figure 3:
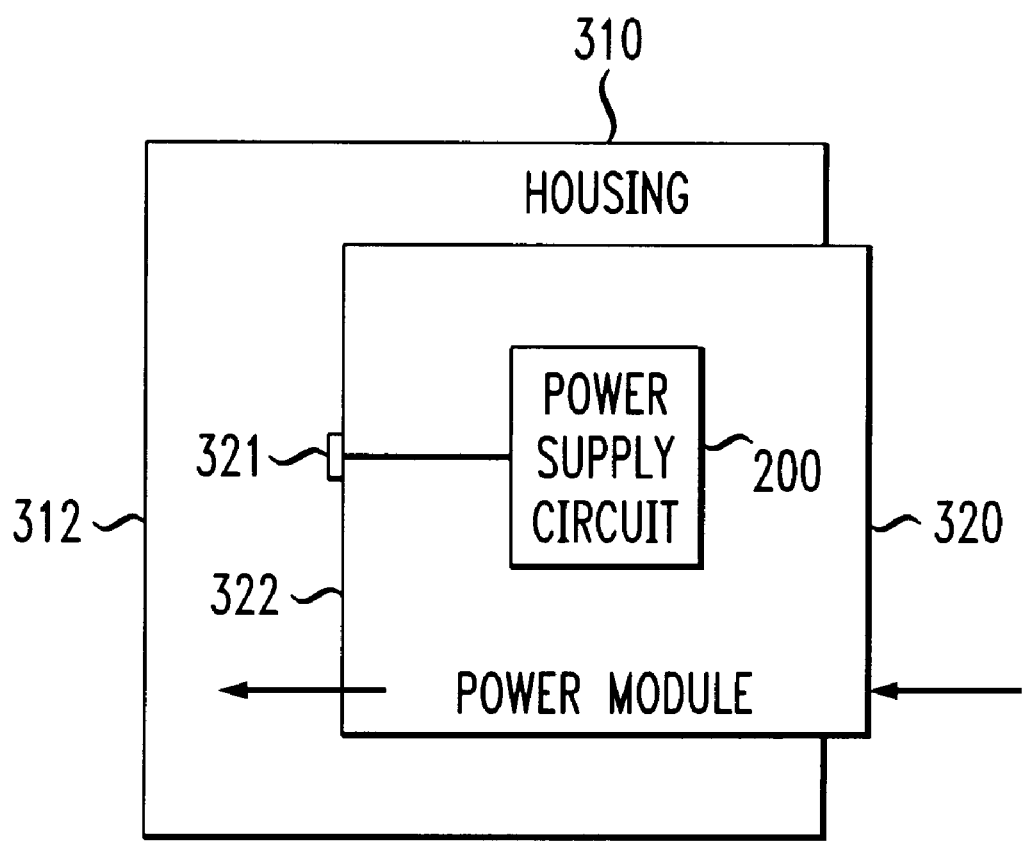
FIG. 3 is a block diagram of a power supply system incorporating the power supply circuit of FIG. 1.

Referring now to FIG. 3, there is shown a block diagram of a power supply system 300 incorporating power supply circuit 200 of FIG. 1. System 300 comprises a housing 310 adapted to receive a power module 320, which itself comprises power supply circuit 200. The pressure sensitive portion 321 of interlock switch $SW_{22}$ is attached to the back plane 322 of power module 320, so that, when power module 320 is fully seated inside housing 310 so that back plane 322 of power module 320 is in contact with the back plane 312 of housing 310, switch $SW_{22}$ is on.

Therefore, to ensure that both power sources are turned off whenever the power module 320 is not fully seated in the housing 310, interlock switch $SW_{22}$ is adapted so that it is only on when pressure caused by fully seating the power module 320 turns it on. Referring once more to FIG. 2, it can thus be seen that, when interlock switch $SW_{22}$ is off, node 231, at the junction of resistors $R_{22}$ and $R_{23}$ and the base terminal of transistor $Q_{20}$, is grounded, through switch $SW_{22}$. Thus, transistor $Q_{20}$ is turned off (i.e., AC connection network 221 is disabled or inactive), and no current flows through load $R_{L2}$ from the AC power source 201. In this case, AC connection network 221 does not serve to connect or couple AC power source 201 to load $R_{L2}$, since interlock switch $SW_{22}$ being off causes AC connection network 221 to fail to allow such a connection.

Similarly, node 232, at the junction of resistors $R_{24}$ and $R_{25}$ and the base terminal of transistor $Q_{21}$, is not coupled to ground when interlock switch $SW_{22}$ is off. A current thus flows through resistor $R_{25}$, driven by DC power source 211, which gives rise to a voltage at node 232 sufficient to turn on transistor $Q_{21}$. This diverts current flowing through resistor $R_{27}$ through transistor $Q_{21}$ instead of through resistor $R_{26}$, and effectively grounds the base terminal of transistor $Q_{22}$. Thus, transistor $Q_{22}$ is turned off, and no current flows through load $R_{L2}$ from the DC power source 211 (i.e., DC connection network 223 is disabled or inactive). In this case, DC connection network 223 does not serve to connect or couple DC power source 211 to load $R_{L2}$, since interlock switch $SW_{22}$ being off causes DC connection network 223 to fail to allow such a connection.

It can be seen that both power sources are turned off as long as interlock switch $SW_{22}$ is off, since node 231 is still grounded, and node 232 is not grounded since interlock switch $SW_{22}$ in off position decouples node 232 from ground, regardless of the state of AC/DC switch $SW_{21}$. Whenever interlock switch $SW_{22}$ is off, i.e. whenever the power module 320 is not fully seated in the housing 310, circuit 200 is in interlock mode. When interlock switch $SW_{22}$ is on, circuit 200 is not in interlock mode, and, therefore, AC/DC switch $SW_{21}$ can be used to turn the AC and DC power sources 201, 211 on or off, as described below.

To turn on AC and DC power sources 201, 211, interlock switch $SW_{22}$ must be turned on, and AC/DC switch $SW_{21}$ is also turned on, to activate AC connection network 221 and DC connection network 223. Turning on AC/DC switch $SW_{21}$ when the circuit is not in interlock mode decouples node 231 from ground, thereby allowing transistor $Q_{20}$ to turn on, which allows current to flow from the AC power source's DC output 203 through load $R_{L2}$. Thus, when circuit 200 is not in interlock mode, turning on AC/DC switch $SW_{21}$ activates AC connection network 221, which causes AC power source 201 to be coupled to load $R_{L2}$.

At the same time, turning on AC/DC switch $SW_{21}$ also activates DC connection network 223. Turning on AC/DC switch $SW_{21}$ when the circuit is not in interlock mode couples node 232 to ground, thereby allowing transistor $Q_{22}$ to turn on, which allows current to flow from the DC power source 211 through load $R_{L2}$. Thus, when circuit 200 is not in interlock mode, turning on AC/DC switch $SW_{21}$ activates DC connection network 223, which causes DC power source 211 to be coupled to load $R_{L2}$.

Thus, when in normal operation, the power module 320 comprising circuit 200 is fully seated in housing 310, so that interlock switch $SW_{22}$ is on, and AC/DC switch $SW_{21}$ is also turned on, so that both power sources are applied to load $R_{L2}$. DC power source 211 may serve as a back-up in case of power failure or irregularities in AC power source 201. During normal operation, DC power source 211, which may be a rechargeable battery, is constantly re-charged by DC output 203 from AC power source 201. Whenever AC power source 201 fails, for example due to a power outage, DC power source 211 drives load $R_{L2}$ with no loss of continuity. Whenever the power module 320 is removed from its housing 310, pressure is released from the back plane 322 of the circuit board, which contains the pressure-sensitive portion 321 of switch $SW_{22}$, thereby causing interlock mode to be established and turning off both power sources 201, 211.

Switching network 222 also performs the isolation function described above, since no switch configuration provides a current path between nodes 232 and 231. Thus, switching network 222 is isolated, such that switching network 222 does not provide a current patch between AC connection network 221 and DC connection network 223. However, as opposed to prior art circuit 100, which employs three switches in switching network 122, the present invention accomplishes the desired functions with only two switches, thereby realizing cost, PWB area, and complexity advantages over prior art circuit 100.

Those skilled in the art will appreciate that, in alternative embodiments, different types of connection networks may be employed to couple each of multiple power sources to a load, in response to configuration of the switching network. In addition, in alternative embodiments, the two power sources need not be AC and DC, but may be two DC or two AC power sources. In still further alternative embodiments, the loads may be physically separate loads, instead of physically the same load. In another alternative embodiment, more than two power sources are employed in a given power supply circuit, and the switch configuration of switching network 222 is duplicated or modified as appropriate to control connection networks for each power source, whilst minimizing the number of switches and providing switch isolation. In another alternative embodiment, a switch configuration different from that of switching network 222 may be employed, as long as only two switches need be used, while still providing the isolation function as well as the interlocking and manual switching function.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. A power supply circuit for driving a load with a first power source and with a second power source, comprising:
   (a) a switching network comprising a first switch and an interlock switch;
   (b) a first circuit section for connecting the first power source to the load only when both the first switch and the interlock switch are on; and
   (c) a second circuit section for connecting the second power source to the load only when both the first switch and the interlock switch are on, wherein the switching network provides isolation between the first and second circuit sections.

2. The circuit of claim 1, wherein the power supply circuit is incorporated in a power module that is seatable in a housing.

3. The circuit of claim 2, wherein the power module comprises a pressure-sensitive portion of the interlock switch mounted on the power module such that the pressure-sensitive portion is depressed, thereby turning on the interlock switch, when the power module is fully seated in the housing.

4. The circuit of claim 1, wherein the first power source is an AC power source and the second power source is a DC power source.

5. The circuit of claim 1, wherein the first switch is a single-pole double throw switch and the interlock switch is a double-pole double-throw switch.

6. The circuit of claim 1, wherein:
   the first circuit section comprises a first connection network having a first transistor in series with the load;
   the first transistor is intercoupled with the first connection network so that, when the base terminal of the first transistor is not coupled to ground, the first transistor is on, thereby causing the first power source to be applied to the load;

the second circuit section comprises a second connection network having a second transistor in series with the load and a third transistor coupled to the base of the second transistor;

the second and third transistors are intercoupled with the connection network so that, when the base terminal of the third transistor is coupled to ground, the second transistor is on, thereby causing the second power source to be applied to the load;

the first switch and the interlock switch are configured and coupled to the first and second circuit sections so that the base terminal of the first transistor is not coupled to ground, and the base terminal of the third transistor is coupled to ground, only when both the first switch and the interlock switch are in an on position.

7. A power supply circuit for driving a load with a first power source and with a second power source, comprising:

(a) a first circuit section for connecting the first power source to the load only when a first base terminal is not coupled to ground;

(b) a second circuit section for connecting the second power source to the load only when a second base terminal is coupled to ground; and (c) a switching network comprising a single-pole double-throw first switch and a double-pole double-throw interlock switch having first and second interlock switches, wherein the first switch couples the first base terminal to ground in an off position and couples a switch node to ground in the on position; the first interlock switch couples the first base terminal to ground only in an off position; and the second interlock switch couples the switch node to the second base terminal only in an on position.

8. The circuit of claim 7, wherein:

the first circuit section comprises a first connection network having a first transistor in series with the load, wherein the first base terminal is a base terminal of the first transistor and the first transistor is off only when the first base terminal is coupled to ground; and the second circuit section comprises a second connection network having a second transistor in series with the load and a third transistor coupled to the base of the second transistor, wherein: the second base terminal is a base terminal of the third transistor, the third transistor is off only when the second base terminal is coupled to ground, and the second transistor is off only when the third transistor is on.

* * * * *